US012662603B2

(12) United States Patent
Taniguchi et al.

(10) Patent No.: US 12,662,603 B2
(45) Date of Patent: Jun. 23, 2026

(54) INK JET INK COMPOSITION AND RECORDING METHOD

(71) Applicant: Seiko Epson Corporation, Tokyo (JP)

(72) Inventors: Manabu Taniguchi, Shiojiri (JP);
Hiroaki Kumeta, Matsumoto (JP);
Soichi Yamazaki, Shiojiri (JP);
Yoshifumi Hano, Matsumoto (JP);
Shunsuke Uchizono, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 745 days.

(21) Appl. No.: 17/700,752

(22) Filed: Mar. 22, 2022

(65) Prior Publication Data

US 2022/0306881 A1       Sep. 29, 2022

(30) Foreign Application Priority Data

Mar. 23, 2021    (JP) ................................. 2021-048636

(51) Int. Cl.
C09D 11/38         (2014.01)
C09D 11/324        (2014.01)

(52) U.S. Cl.
CPC ............ C09D 11/38 (2013.01); C09D 11/324 (2013.01)

(58) Field of Classification Search
CPC ..... C09D 11/38; C09D 11/324; C09D 11/322; C09D 11/36; B41M 5/00
See application file for complete search history.

(56) References Cited

U.S. PATENT DOCUMENTS

| | | | |
|---|---|---|---|
| 6,234,601 B1 * | 5/2001 | Hayashi ................. | B41J 2/2107 347/100 |
| 2005/0172855 A1 | 8/2005 | Iijima et al. | |
| 2010/0196602 A1 * | 8/2010 | Koyano .............. | B41J 2/14274 524/588 |
| 2011/0236649 A1 * | 9/2011 | Nishiki .................. | C09D 11/38 427/256 |
| 2013/0106945 A1 * | 5/2013 | Ikeda .................... | C09D 11/326 347/20 |
| 2013/0194344 A1 * | 8/2013 | Yokohama ............. | C09D 11/38 347/20 |
| 2017/0334837 A1 * | 11/2017 | Komori ................. | G03F 7/0048 |

FOREIGN PATENT DOCUMENTS

| | | | |
|---|---|---|---|
| JP | 2005-220296 A | | 8/2005 |
| JP | 2006-045450 A | | 2/2006 |
| JP | 2012211260 A | * | 11/2012 |
| JP | 2017141388 A | * | 8/2017 |

OTHER PUBLICATIONS

English machine translation of JP-2017141388-A (Year: 2017).*
English machine translation of JP-2012211260-A (Year: 2012).*

* cited by examiner

*Primary Examiner* — Amber R Orlando
*Assistant Examiner* — Jeffrey Eugene Barzach
(74) *Attorney, Agent, or Firm* — Harness, Dickey & Pierce, P.L.C.

(57) ABSTRACT

An ink jet ink composition includes a self-dispersible pigment; an alcohol having 4 carbon atoms or less; an asymmetric alkyl ether; and water, a content of the alcohol with respect to a total mass of the ink jet ink composition is 0.5 to 15 percent by mass, and a content of the water with respect to the total mass of the ink jet ink composition is 10 to 40 percent by mass.

11 Claims, 1 Drawing Sheet

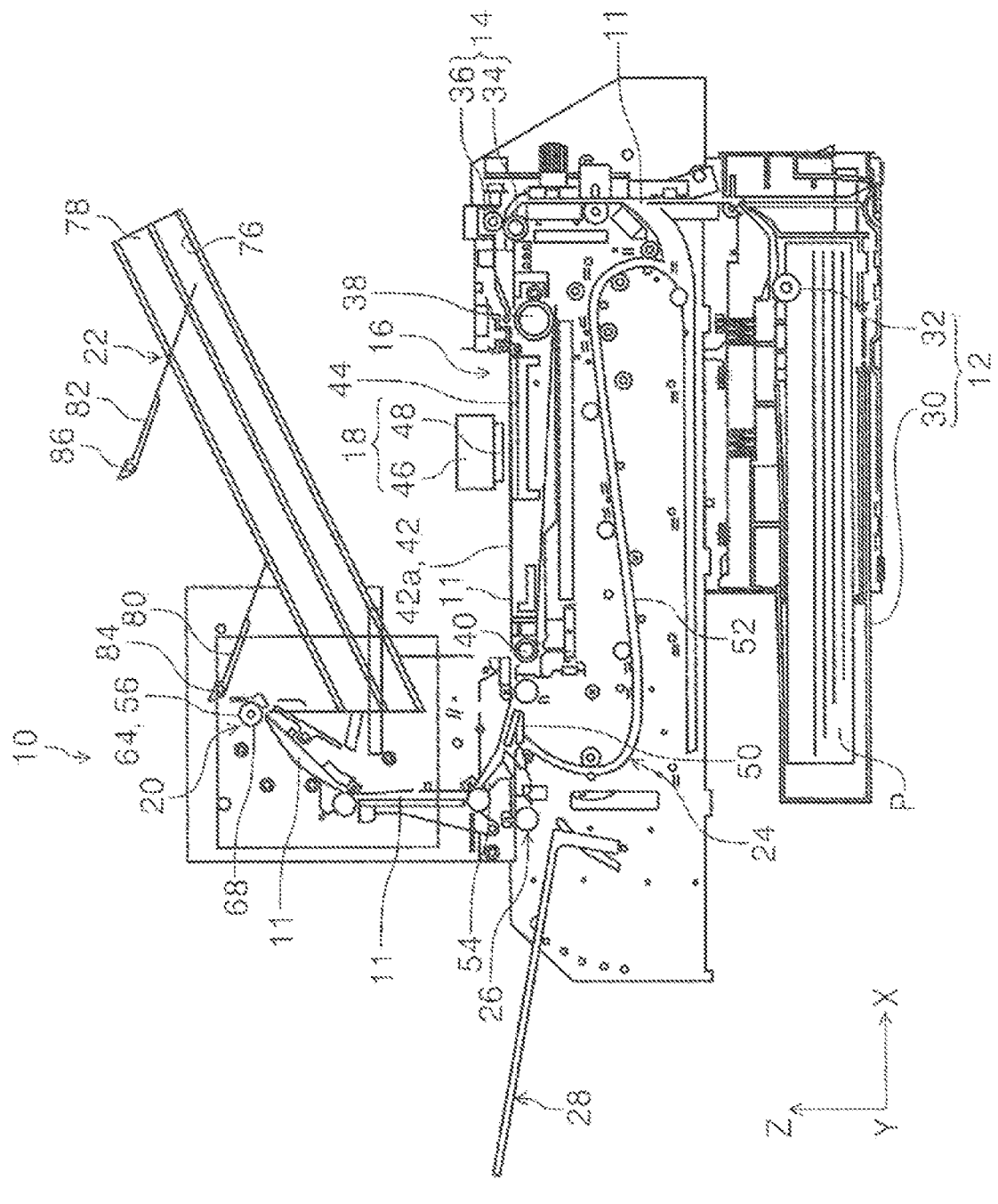

INK JET INK COMPOSITION AND RECORDING METHOD

The present application is based on, and claims priority from JP Application Serial Number 2021-048636, filed Mar. 23, 2021, the disclosure of which is hereby incorporated by reference herein in its entirety.

BACKGROUND

1. Technical Field

The present disclosure relates to an ink jet ink composition and a recording method.

2. Related Art

An ink jet recording method is able to record a highly fine image by a relatively simple apparatus, and developments thereof have been rapidly carried out in various fields. Among those developments, various studies, for example, on curling suppression and ejection stability, have been carried out. In order to provide an ink jet ink which has improved ejection characteristics in printing and improved decap characteristic and which also has excellent strike-through resistance, print quality, and curling suppression when being printed on regular paper, for example, JP-A-2005-220296 has disclosed an ink which has a surface tension and a viscosity in respective predetermined ranges and which uses water and a predetermined organic solvent.

In recent years, for an ink jet ink composition used for regular paper printing, a self-dispersible pigment has been preferably used. However, it has become understood that when a self-dispersible pigment is used as a colorant for the ink composition disclosed in the above patent document, a dispersion stability of the pigment is degraded, and an ejection defect occurs.

SUMMARY

According to an aspect of the present disclosure, there is provided an ink jet ink composition comprising: a self-dispersible pigment; an alcohol having 4 carbon atoms or less; an asymmetric alkyl ether; and water. In the ink jet ink composition described above, a content of the alcohol with respect to a total mass of the ink jet ink composition is 0.5 to 15 percent by mass, and a content of the water with respect to the total mass of the ink jet ink composition is 10 to 40 percent by mass.

In addition, according to another aspect of the present disclosure, there is provided a recording method comprising: an ejection step of ejecting the ink jet ink composition described above to a recording medium by an ink jet method.

BRIEF DESCRIPTION OF THE DRAWINGS

FIGURE is a schematic cross-sectional view showing a recording apparatus according to this embodiment.

DESCRIPTION OF EXEMPLARY EMBODIMENTS

Hereinafter, if needed, with reference to the drawing, although an embodiment (hereinafter, referred to as "this embodiment") of the present disclosure will be described in detail, the present disclosure is not limited thereto and may be variously changed and/or modified without departing from the scope of the present disclosure. In addition, in the drawing, the same element is designated by the same reference numeral, and duplicated description will be omitted. In addition, a positional relationship, such as up and down and left and right, is based on the positional relationship shown in the drawing unless otherwise particularly noted. Furthermore, a dimensional ratio of the drawing is not limited to that shown in the drawing.

1. Ink Jet Ink Composition

An ink jet ink composition (hereinafter, simply referred to as "ink composition" in some cases) of this embodiment includes a self-dispersible pigment, an alcohol having 4 carbon atoms or less, an asymmetric alkyl ether, and water, a content of the alcohol with respect to a total mass of the ink jet ink composition is 0.5 to 15 percent by mass, and a content of the water with respect to the total mass of the ink jet ink composition is 10 to 40 percent by mass.

Heretofore, when a water-based ink composition containing water as a primary solvent component is adhered to an absorbing recording medium such as regular paper, curling is disadvantageously generated. Since this curling is generated when the water contained in the ink composition permeates the recording medium, in order to suppress the curling, a decrease in content of the water in the ink composition is considered. However, when the content of the water is decreased, the dispersion stability of the pigment is degraded, and furthermore, another problem, that is, generation of ejection defect, may also arise.

Accordingly, in this embodiment, while the content of the water is controlled so as to suppress the curling, since the alcohol having 4 carbon atoms or less and the asymmetric alkyl ether are used in combination, dispersibility of the self-dispersible pigment is stabilized even if the content of the water is relatively small. Accordingly, the curling suppression and the ejection stability can be maintained.

Although the reason the dispersibility of the self-dispersible pigment is stabilized by using the alcohol having 4 carbon atoms or less and the asymmetric alkyl ether in combination has not been clearly identified, for example, the reason is considered that since the alcohol having 4 carbon atoms or less and the asymmetric alkyl ether are softly adsorbed on the surface of the self-dispersible pigment, electrostatic repulsion between particles of the self-dispersible pigment and a repulsive force caused by the steric hindrance can be increased. In addition, besides those described above, it is also considered that since interacting with each other, the alcohol having 4 carbon atoms or less and the asymmetric alkyl ether are stabilized with each other. In addition, a mechanism on the dispersion stability is not limited to those described above. Hereinafter, individual components of the ink composition of this embodiment will be described in detail.

1.1. Self-Dispersible Pigment

The self-dispersible pigment indicates a pigment dispersible in an aqueous medium by hydrophilic groups on the surface thereof without using a dispersant. Since the self-dispersible pigment as described above is used, handling merits, such as suppression in viscosity increase of an ink composition caused by a dispersant, can be obtained with no dispersant.

A content (solid content) of the self-dispersible pigment with respect to the total mass of the ink composition is preferably 1.0 to 10 percent by mass, more preferably 2.0 to 8.0 percent by mass, and further preferably 3.0 to 6.0 percent by mass.

1.2. Alcohol having 4 Carbon Atoms or Less

As the alcohol having 4 carbon atoms or less, for example, there may be mentioned methanol, ethanol, n-propyl alcohol, isopropyl alcohol, n-butanol, 2-butanol, t-butanol, or isobutanol. The alcohols mentioned above may be used alone, or at least two types thereof may be used in combination.

Among those alcohols mentioned above, an alcohol having 1 to 3 carbon atoms is preferable, and an alcohol having 1 to 2 carbon atoms is more preferable. Since the alcohol as described above is used, the dispersion stability of the self-dispersible pigment is further improved, and the ejection stability of the ink composition tends to be further improved.

A content of the alcohol having 4 carbon atoms or less with respect to the total mass of the ink composition is 0.5 to 15 percent by mass, preferably 1.0 to 12.5 percent by mass, more preferably 2.5 to 10 percent by mass, and further preferably 2.5 to 7.5 percent by mass. Since the content of the alcohol having 4 carbon atoms or less is in the range described above, and the content of the water is relatively decreased thereby, the curling is not likely to be generated, and in addition, the ejection stability of the ink composition tends to be further improved.

In addition, a content of the alcohol having 4 carbon atoms or less with respect to one part by mass of the self-dispersible pigment is preferably 0.1 to 2.5 parts by mass, more preferably 0.2 to 2.0 parts by mass, and further preferably 0.5 to 1.5 parts by mass. Since the content of the alcohol having 4 carbon atoms or less with respect to the self-dispersible pigment is in the range described above, the ejection stability of the ink composition tends to be further improved.

1.3. Asymmetric Alkyl Ether

The asymmetric alkyl ether represents an alkyl ether having asymmetric functional groups at two terminals thereof. Although the asymmetric alkyl ether described above is not particularly limited, for example, a compound represented by the following formula (1) may be mentioned. The asymmetric alkyl ether may be used alone, or at least two types thereof may be used in combination.

$$R^1O-(R^3O)_n-R^2 \qquad (1)$$

In the formula (1) described above, $R^1$ and $R^2$ each independently represent a hydroxy group, an alkyl group, an alkyl group having a hydroxy group, or an acyl group, $R^1$ and $R^2$ represent groups different from each other, $R^3$ represents an alkylene group having 2 to 4 carbon atoms, and n represents an integer of 1 to 4.

Although the alkyl group represented by $R^1$ or $R^2$ is not particularly limited, for example, there may be mentioned a methyl group, an ethyl group, an n-propyl group, an isopropyl group, an n-butyl group, an isobutyl group, a sec-butyl group, or a t-butyl group.

In addition, although the alkyl group having a hydroxy group is not particularly limited, for example, an alkyl group in which at least one hydrogen atom of one of the alkyl groups mentioned above is substituted by a hydroxy group may be mentioned.

The acyl group represented by $R^1$ or R2 is not particularly limited, and for example, there may be mentioned a formyl group, an acetyl group, a propanoyl group, or a butanoyl group.

A total number of carbon atoms of $R^1$ and R2 is preferably 1 to 6, more preferably 1 to 4, and further preferably 1 to 3. In addition, n represents preferably 1 to 4, more preferably 1 to 3, and further preferably 2 to 3.

A total number of carbon atoms of $R^1$ and R2 with respect to n is preferably 1.5 or less, more preferably 0.2 to 1.5, and further preferably 0.3 to 1.4. Since a ratio of the total number of carbon atoms of $R^1$ and R2 to n is in the range described above, the dispersion stability of the self-dispersible pigment is further improved, and the ejection stability of the ink composition tends to be further improved.

Although the asymmetric alkyl ether represented by the above formula (1) is not particularly limited, for example, there may be mentioned at least one selected from the group consisting of diethylene glycol monobutyl ether, triethylene glycol monomethyl ether, triethylene glycol monobutyl ether, and diethylene glycol monoethyl ether acetate. Among those mentioned above, at least one selected from the group consisting of triethylene glycol monomethyl ether, triethylene glycol monobutyl ether, and diethylene glycol monoethyl ether acetate is preferable. Since the asymmetric alkyl ether as described above is used, the dispersion stability of the self-dispersible pigment is further improved, and the ejection stability of the ink composition tends to be further improved.

A content of the asymmetric alkyl ether with respect to the total mass of the ink composition is preferably 30 to 60 percent by mass, more preferably 30 to 55 percent by mass, and further preferably 35 to 55 percent by mass. Since the content of the asymmetric alkyl ether is in the range described above, and the content of the water is relatively decreased thereby, the curling is not likely to be generated, and in addition, the dispersion stability of the self-dispersible pigment is further improved, and the ejection stability of the ink composition tends to be further improved.

In addition, a content of the asymmetric alkyl ether with respect to one part by mass of the self-dispersible pigment is preferably 2.5 to 16 parts by mass, more preferably 5.0 to 14 parts by mass, and further preferably 7.5 to 12 parts by mass. Since the content of the asymmetric alkyl ether with respect to the self-dispersible pigment is in the range described above, the ejection stability of the ink composition tends to be further improved.

Furthermore, a content of the asymmetric alkyl ether with respect to one part by mass of the alcohol having 4 carbon atoms or less is preferably 1.0 to 100 parts by mass, more preferably 2.5 to 50 parts by mass, and further preferably 5.0 to 20 parts by mass. Since the content of the asymmetric alkyl ether with respect to the alcohol having 4 carbon atoms or less is in the range described above, the ejection stability of the ink composition tends to be further improved.

1.4. Water

A content of the water with respect to the total mass of the ink composition is 10 to 40 percent by mass, preferably 15 to 40 percent by mass, and more preferably 20 to 40 percent by mass. Since the content of the water is 40 percent by mass or less, the curling of a recorded matter to be obtained is suppressed. In addition, since the content of the water is 10 percent by mass or more, the ejection stability of the ink composition is further improved, and in addition, a color development property of the recorded matter to be obtained is further improved, and a strike-through phenomenon thereof can also be suppressed.

1.5. Other Components

The ink composition of this embodiment may further contain, if needed, an aprotic solvent, a moisturizing agent, a surfactant, and/or other additives.

1.5.1. Aprotic Solvent

Although the aprotic solvent is not particularly limited, for example, there may be mentioned 1,4-dioxane, N,N-dimethylacetamide, N,N-dimethylimidazolidinone, N,N-diethylacetamide, N,N-diethylformamide, N,N-dimethylformamide, N-methyl caprolactam, N-methyl-pyrrolidone, N-methylpropionamide, β-butyrolactone, γ-butyrolactone, acetonitrile, dimethylsulfoxide, sulfolane, tetrahydrofuran, N-methyl-2-pyrrolidone, N-ethyl-2-pyrrolidone, 2-pyrrolidone, 1-(2-hydroxyethyl)-2-pyrrolidone, 2-oxazolidone, 1,3-dimethyl-2-imidazolidinone, propylene carbonate, or ethylene carbonate. Those aprotic solvents mentioned above may be used alone, or at least two types thereof may be used in combination.

Among those solvents mentioned above, at least one selected from the group consisting of N-methyl-2-pyrrolidone, 2-pyrrolidone, 1-(2-hydroxyethyl)-2-pyrrolidone, γ-butyrolactone, propylene carbonate, and ethylene carbonate is preferably contained, and at least one selected from the group consisting of 2-pyrrolidone, 1-(2-hydroxyethyl)-2-pyrrolidone, γ-butyrolactone, propylene carbonate, and ethylene carbonate is more preferably contained. Since the aprotic solvent as mentioned above has a strong polarity, even if the aprotic solvent as described above is used instead of water, the dielectric constant of the ink composition is not significantly decreased. Hence, the ejection stability of the ink composition tends to be further improved.

A content of the aprotic solvent with respect to the total mass of the ink composition is preferably 10 to 40 percent by mass, more preferably 15 to 35 percent by mass, and further preferably 15 to 30 percent by mass. Since the content of the aprotic solvent is in the range described above, and the content of the water is relatively decreased thereby, the curling is not likely to be generated, and in addition, the ejection stability of the ink composition and the color development property of the recorded matter to be obtained tend to be further improved.

1.5.2. Moisturizing Agent

Although the moisturizing agent is not particularly limited, for example, a solvent, such as glycerin, propylene glycol, or diethylene glycol, having a relatively high boiling point may be mentioned. Those agents may be used alone, or at least two types thereof may be used in combination. A standard boiling point of the moisturizing agent is preferably 180° C. or more and more preferably 200° C. or more.

A content of the moisturizing agent with respect to the total mass of the ink composition is preferably 0.5 to 6.0 percent by mass, more preferably 1.0 to 5.0 percent by mass, and further preferably 2.0 to 4.0 percent by mass. Since the content of the moisturizing agent is in the range described above, the ejection stability of the ink composition tends to be further improved.

1.5.3. Surfactant

Although the surfactant is not particularly limited, for example, an acetylene glycol-based surfactant, a fluorine-based surfactant, or a silicone-based surfactant may be mentioned. Among those mentioned above, the acetylene glycol-based surfactant and the silicone-based surfactant are preferably used in combination.

Although the acetylene glycol-based surfactant is not particularly limited, for example, at least one selected from the group consisting of 2,4,7,9-tetramethyl-5-decyne-4,7-diol, an alkylene oxide adduct thereof, 2,4-dimethyl-5-decyne-4-ol, and an alkylene oxide adduct thereof is preferable.

Although the fluorine-based surfactant is not particularly limited, for example, there may be mentioned a perfluoroalkyl sulfonate, a perfluoroalkyl carboxylate, a perfluoro phosphate, a perfluoroalkyl ethylene oxide adduct, a perfluoroalkyl betaine, or a perfluoroalkyl amine oxide compound.

As the silicone-based surfactant, for example, a polysiloxane-based compound or a polyether-modified organosiloxane may be mentioned.

A content of the surfactant with respect to the total mass of the ink composition is preferably 0.1 to 2.0 percent by mass, more preferably 0.3 to 1.5 percent by mass, and further preferably 0.5 to 1.0 percent by mass.

2. Recording Method

A recording method of this embodiment includes an ejection step of ejecting the ink composition described above to a recording medium by an ink jet method, and if needed, may also include a drying step or the like.

2.1. Ejection Step

In the ejection step, the ink is ejected from an ink jet head and is adhered to the recording medium. In more particular, by driving a pressure generating device provided in the ink jet head, the ink filled in the pressure generating device of the ink jet head is ejected from a nozzle. The ejection method as described above is also called an ink jet method.

As the ink jet head used in the ejection step, a line head to perform recording by a line method or a serial head to perform recording by a serial method may be mentioned.

In the line method using a line head, for example, an ink jet head having a width equivalent to or larger than a recording width of a recording medium is fixed to a recording apparatus. In addition, the recording medium is transported along a sub-scanning direction (transport direction of the recording medium), and in conjunction with this transportation, an ink droplet is ejected from a nozzle of the ink jet head, so that an image is recorded on the recording medium.

In the serial method using a serial head, for example, an ink jet head is mounted on a carriage configured to be transferred in a width direction of a recording medium. In addition, the carriage is transferred along a main scanning direction (width direction of the recording medium), and in conjunction with this transfer, an ink droplet is ejected from a nozzle of the head, so that an image is recorded on the recording medium.

2.2. Recording Medium

Although a recording medium used in this embodiment is not particularly limited, for example, an absorbing or a non-absorbing recording medium may be mentioned. Among those media mentioned above, since an absorbing recording medium is liable to cause a curling problem, the present disclosure is advantageous.

Although the absorbing recording medium is not particularly limited, for example, there may be mentioned regular paper, such as electrophotographic paper, having a high ink permeability; ink jet paper (ink jet exclusive paper having an ink absorbing layer formed from silica particles or aluminum particles or having an ink absorbing layer formed from a hydrophilic polymer, such as a poly(vinyl alcohol) (PVA) or a poly(vinyl pyrrolidone) (PVP)); or art paper, coated paper, or cast paper, which has a relatively low ink permeability and which is used for general offset printing.

Among those mentioned above, the recording medium is preferably regular paper. Since the regular paper is liable to cause a curling problem, the present disclosure is advantageous.

In this case, the "absorbing recording medium" indicates a "recording medium having a water absorbing amount of more than 10 mL/m² for 30 msec from a contact start measured by Bristow method". This Bristow method is a most popular measurement method of a liquid absorption amount in a short time and has also been employed by Japan Technical Association of the Pulp and Paper Industry (JAPAN TAPPI). The details of the test method has been disclosed in Standard No. 51 "Paper and Paperboard-Liquid Absorption Test Method-Bristow Method", JAPAN TAPPI PAPER AND PULP TEST METHODS, 2000.

3. Recording Apparatus

A recording apparatus of this embodiment includes an ink jet head having at least one nozzle to eject an ink jet ink to a recording medium and a transport device to transport the recording medium. The ink jet head includes a pressure chamber to which the ink is supplied and the nozzle to eject the ink. In addition, the transport device is formed from a transport roller and/or a transport belt provided in the recording apparatus.

Hereinafter, the recording apparatus according to this embodiment will be described with reference to FIGURE. In addition, in the X-Y-Z coordinate system shown in FIGURE, an X direction indicates a length direction of the recording medium, a Y direction indicates a width direction of the recording medium in a transport path in the recording apparatus, and a Z direction indicates a height direction of the apparatus.

As one example of a recording apparatus 10, a line type ink jet printer capable of performing printing at a high rate and at a high density will be described. The recording apparatus 10 includes a feed portion 12 to store a recording medium P such as paper, a transport portion 14, a belt transport portion 16, a record portion 18, an Fd (facedown) discharge portion 20 functioning as a "discharge portion", an Fd (facedown) stage 22 functioning as a "stage", a reverse path portion 24 functioning as a "reverse transport mechanism", an Fu (faceup) discharge portion 26, and an Fu (faceup) stage 28.

The feed portion 12 is disposed at a lower side of the recording apparatus 10. The feed portion 12 includes a feed tray 30 to store the recording medium P and a feed roller 32 to feed the recording medium P stored in the feed tray 30 to a transport path 11.

The recording medium P stored in the feed tray 30 is fed to the transport portion 14 along the transport path 11 by the feed roller 32. The transport portion 14 includes a transport drive roller 34 and a transport driven roller 36. The transport drive roller 34 is rotationally driven by a driving source not shown. In the transport portion 14, the recording medium P is nipped between the transport drive roller 34 and the transport driven roller 36 and is then transported to the belt transport portion 16 located downstream of the transport path 11.

The belt transport portion 16 includes a first roller 38 located upstream of the transport path 11, a second roller 40 located downstream thereof, an endless belt 42 fitted to the first roller 38 and the second roller 40 in a rotationally transferable manner, and a support body 44 to support an upper-side section 42a of the endless belt 42 between the first roller 38 and the second roller 40.

The endless belt 42 is driven by the first roller 38 driven by the driving source not shown or the second roller 40 so as to be transferred from a +X direction to a −X direction in the upper-side section 42a. Hence, the recording medium P transported from the transport portion 14 is further transported downstream of the transport path 11 in the belt transport portion 16.

The record portion 18 includes a line type ink jet head 48 and a head holder 46 to hold the ink jet head 48. In addition, the record portion 18 may also be a serial type in which an ink jet head is mounted on a carriage which is reciprocally transferred in a Y axis direction. The ink jet head 48 is disposed so as to face the upper-side section 42a of the endless belt 42 supported by the support body 44. When the recording medium P is transported in the upper-side section 42a of the endless belt 42, the ink jet head 48 ejects the ink to the recording medium P, so that the recording is carried out. While the recording is carried out, the recording medium P is transported downstream of the transport path 11 by the belt transport portion 16.

In addition, the line type ink jet head is a head used for the recording apparatus in which a nozzle region formed in a direction intersecting the transport direction of the recording medium P is provided so as to cover the entire recording medium P in the intersecting direction, and while one of the head and the recording medium P is fixed, the other is transferred to form an image. In addition, the nozzle region of the line head in the intersecting direction may not cover the entire recording medium P in the intersecting direction in the recording apparatus.

In addition, at downstream of the transport path 11 of the belt transport portion 16, a first branch portion 50 is provided. The first branch portion 50 is configured to switchably communicate with one of the transport path 11 to transport the recording medium P to the Fd discharge portion 20 or the Fu discharge portion 26 and the reverse path 52 of the reverse path portion 24 in which after a recording surface of the recording medium P is reversed, the recording medium P is again transported to the record portion 18. In addition, the recording medium P to be transported after the transport path 11 is switched to the reverse path 52 by the first branch portion 50 is processed such that the recording surface thereof is reversed in a transport process in the reverse path 52 and is again transported to the record portion 18 so that a surface of the recording medium P opposite to the original recording surface faces the ink jet head 48.

At downstream of the first branch portion 50 along the transport path 11, a second branch portion 54 is further provided. The second branch portion 54 is configured so as to transport the recording medium P to one of the Fd discharge portion 20 and the Fu discharge portion 26 by switching the transport direction of the recording medium P.

The recording medium P transported to the Fd discharge portion 20 by the second branch portion 54 is discharged from the Fd discharge portion 20 and then placed on the Fd stage 22. In this case, the recording surface of the recording medium P is placed so as to face the Fd stage 22. In addition, the recording medium P transported to the Fu discharge portion 26 by the second branch portion 54 is discharged from the Fu discharge portion 26 and then placed on the Fu stage 28. In this case, the recording surface of the recording medium P is placed so as to face a side opposite to the Fu stage 28.

In the recording apparatus using an ink jet method, since an ink in the form of liquid is adhered to a recording medium, a recording medium, in particular, an absorbing recording medium, such as regular paper or an ink jet paper, may cause a curling problem or the like. On the other hand, in this embodiment, since the content of the water can be relatively decreased, the curling can be suppressed.

In addition, the case in which the line type ink jet head is used has been described above by way of example, the recording apparatus of this embodiment may be a printer (serial printer) using a serial type ink jet head. In the serial printer, while a recording medium is transported in a transport direction, the ink jet head is transferred in a direction intersecting the transport direction described above, so that the recording is performed.

EXAMPLES

Hereinafter, the present disclosure will be described in more detail with reference to Examples and Comparative Examples. However, the present disclosure is not limited to the following Examples.

1. Preparation of Ink

After individual components were charged in a mixture tank to have one of the compositions shown in Tables 1 and 2 and then mixed and stirred, filtration was further performed using a 5-μm membrane filter, so that an ink jet ink composition of each Example was obtained. In addition, the numerical value of each component of each Example shown in the table indicates percent by mass unless otherwise particularly noted. In addition, in the table, the numerical value of the pigment indicates percent by mass of a solid content.

TABLE 1

| | | EXAMPLE | | | | | | | | | |
| --- | --- | --- | --- | --- | --- | --- | --- | --- | --- | --- | --- |
| | | 1 | 2 | 3 | 4 | 5 | 6 | 7 | 8 | 9 | 10 |
| SELF-DISPERSIBLE PIGMENT | Aqua-Black 162 | 4.0 | 4.0 | 4.0 | 4.0 | 4.0 | 4.0 | 4.0 | 4.0 | 4.0 | 4.0 |
| ALCOHOL | ETHANOL | 5.0 | 0.5 | 0.5 | 15.0 | 2.0 | 8.0 | 5.0 | 5.0 | 5.0 | 5.0 |
| APROTIC SOLVENT | N-METHYL PYRROLIDONE (NMP) | — | 5.0 | 5.0 | 5.0 | 5.0 | 5.0 | 5.0 | — | — | — |
| | 2-PYRROLIDONE | — | 5.0 | 5.0 | 5.0 | 5.0 | 5.0 | 5.0 | 5.0 | 5.0 | 5.0 |
| | 1-(2-HYDROXYETHYL)-2-PYRROLIDONE | — | — | — | — | — | — | — | 5.0 | 5.0 | 5.0 |
| | γ-BUTYROLACTONE | — | 10.0 | 10.0 | 10.0 | 10.0 | 10.0 | 10.0 | 10.0 | 10.0 | 10.0 |
| | PROPYLENE CARBONATE | — | — | — | — | — | — | — | — | — | 10.0 |
| | ETHYLENE CARBONATE | — | — | — | — | — | — | — | — | — | — |
| ASYMMETRIC ALKYL ETHER | DEGmBE | — | 10.0 | 10.0 | 10.0 | 10.0 | 10.0 | 10.0 | 10.0 | — | — |
| | TEGmME | 47.0 | 21.5 | 31.5 | 17.0 | 30.0 | 24.0 | 27.0 | 27.0 | 37.0 | 32.0 |
| | TEGmBE | 0.5 | 0.5 | 0.5 | 0.5 | 0.5 | 0.5 | 0.5 | 0.5 | 0.5 | 0.5 |
| | EDGAC | 5.0 | 5.0 | 5.0 | 5.0 | 5.0 | 5.0 | 5.0 | 5.0 | 5.0 | 5.0 |
| SYMMETRIC ALKYL ETHER | TRIETHYLENE GLYCOL | — | — | — | — | — | — | — | — | — | — |
| MOISTURIZING AGENT | GLYCERIN | 3.0 | 3.0 | 3.0 | 3.0 | 3.0 | 3.0 | 3.0 | 3.0 | 3.0 | 3.0 |
| SURFACTANT | E1010 | 0.3 | 0.3 | 0.3 | 0.3 | 0.3 | 0.3 | 0.3 | 0.3 | 0.3 | 0.3 |
| | BYK307 | 0.3 | 0.3 | 0.3 | 0.3 | 0.3 | 0.3 | 0.3 | 0.3 | 0.3 | 0.3 |
| WATER | — | 35.0 | 35.0 | 25.0 | 25.0 | 25.0 | 25.0 | 25.0 | 25.0 | 25.0 | 20.0 |
| CURLING | — | B | B | A | A | A | A | A | A | A | A |
| EJECTION STABILITY | IMMEDIATELY AFTER INK FILLING | C | B | B | B | A | A | A | A | A | A |
| | ONE WEEK AFTER INK FILLING | C | B | B | B | B | B | B | A | AA | AA |
| COLOR DEVELOPMENT PROPERTY | OD VALUE OF SURFACE | C | A | A | A | A | A | A | A | A | B |
| STRIKE THROUGH | OD VALUE OF REAR SURFACE | A | A | A | A | A | A | A | A | A | B |

TABLE 2

| | | EXAMPLE | | | | | COMPARATIVE EXAMPLE | | | | |
| --- | --- | --- | --- | --- | --- | --- | --- | --- | --- | --- | --- |
| | | 11 | 12 | 13 | 14 | 15 | 1 | 2 | 3 | 4 | 5 |
| SELF-DISPERSIBLE PIGMENT | Aqua-Black 162 | 4.0 | 4.0 | 4.0 | 4.0 | 4.0 | 4.0 | 4.0 | 4.0 | 4.0 | 4.0 |
| ALCOHOL | ETHANOL | 5.0 | 5.0 | 5.0 | 5.0 | 5.0 | — | — | 5.0 | 20.0 | 8.0 |
| APROTIC SOLVENT | N-METHYL PYRROLIDONE (NMP) | — | — | — | — | — | — | — | — | — | — |
| | 2-PYRROLIDONE | 5.0 | 5.0 | — | 5.0 | 5.0 | 5.0 | — | — | 5.0 | — |
| | 1-(2-HYDROXYETHYL)-2-PYRROLIDONE | 5.0 | 5.0 | 20.0 | 5.0 | 10.0 | 5.0 | — | 10.0 | 5.0 | — |

TABLE 2-continued

| | | EXAMPLE | | | | | COMPARATIVE EXAMPLE | | | | |
|---|---|---|---|---|---|---|---|---|---|---|---|
| | | 11 | 12 | 13 | 14 | 15 | 1 | 2 | 3 | 4 | 5 |
| | γ-BUTYROLACTONE | 10.0 | 10.0 | — | 10.0 | 15.0 | 5.0 | — | 10.0 | 5.0 | — |
| | PROPYLENE CARBONATE | 10.0 | 5.0 | — | 5.0 | 5.0 | — | — | — | — | — |
| | ETHYLENE CARBONATE | — | 5.0 | — | 5.0 | 5.0 | — | — | — | — | — |
| ASYMMETRIC ALKYL ETHER | DEGmBE | — | — | — | — | — | — | — | — | — | — |
| | TEGmME | 32.0 | 32.0 | 37.0 | 32.0 | 37.0 | 22.0 | 52.0 | — | 17.2 | 55.0 |
| | TEGmBE | 0.5 | 0.5 | 0.5 | — | — | 0.5 | 0.5 | — | — | 0.5 |
| | EDGAC | 5.0 | 5.0 | 5.0 | — | — | 5.0 | 5.0 | — | 5.0 | 5.0 |
| SYMMETRIC ALKYL ETHER | TRIETHYLENE GLYCOL | — | — | — | — | — | — | — | 32.2 | — | 16.0 |
| MOISTURIZING AGENT | GLYCERIN | 3.0 | 3.0 | 3.0 | 3.5 | 3.5 | 3.0 | 3.0 | 3.0 | 3.0 | 3.0 |
| SURFACTANT | E1010 | 0.3 | 0.3 | 0.3 | 0.3 | 0.3 | 0.3 | 0.3 | 0.4 | 0.4 | 0.3 |
| | BYK307 | 0.3 | 0.3 | 0.3 | 0.3 | 0.3 | 0.3 | 0.3 | 0.4 | 0.4 | 0.3 |
| WATER | — | 20.0 | 20.0 | 25.0 | 25.0 | 10.0 | 50.0 | 35.0 | 35.0 | 35.0 | 8.0 |
| CURLING | — | A | A | A | A | A | D | B | B | B | A |
| EJECTION STABILITY | IMMEDIATELY AFTER INK FILLING | A | A | A | A | A | A | D | C | C | D |
| | ONE WEEK AFTER INK FILLING | AA | AA | AA | AA | A | A | D | D | D | D |
| COLOR DEVELOPMENT PROPERTY | OD VALUE OF SURFACE | B | B | A | A | B | A | C | C | C | C |
| STRIKE THROUGH | OD VALUE OF REAR SURFACE | B | B | A | A | B | A | A | A | A | C |

Abbreviations and product components used in Tables 1 and 2 are as shown below.
[Self-Dispersible Pigment]
    Aqua-Black 162 (manufactured by Tokai Carbon Co., Ltd.)
[Alcohol Having 4 Carbon Atoms or Less]
    Ethanol
[Aprotic Solvent]
    N-methyl-pyrrolidone
    2-pyrrolidone
    1-(2-hydroxyethyl)-2-pyrrolidone
    γ-butyrolactone
    propylene carbonate
    ethylene carbonate
[Asymmetric Alkyl Ether]
    DEGmBE (diethylene glycol monobutyl ether)
    TEGmBE (triethylene glycol monomethyl ether)
    TEGmBE (triethylene glycol monobutyl ether)
    EDGAC (diethylene glycol monoethyl ether acetate)
[Symmetric Alkyl Ether]
    triethylene glycol
[Moisturizing Agent]
    glycerin
[Surfactant]
    E1010 (Olfine E1010, acetylene glycol-based surfactant, manufactured by Air Products and Chemicals, Inc.)
    BYK307 (silicone-based surfactant, manufactured by BYK Japan KK)

2. Evaluation Method 2.1. Curling Evaluation

The ink prepared as described above was filled in a Printer M105 manufactured by Epson, and a solid pattern was printed at a duty of 100% on a A4-size recording medium (Xerox P paper, copy paper, basis weight: 64 g/m², paper thickness: 88 μm, manufactured by Fuji Xerox Co., Ltd.) in an environment at a temperature of 25° C. and a humidity of 50%. Subsequently, the recording medium thus treated was placed on a floor surface in a faceup state, and a floating distance which was the maximum gap between the floor surface and a printed surface was confirmed. The curling was evaluated using the floating distance thus obtained in accordance with the following evaluation criteria.
[Evaluation Criteria]
    A: Floating distance of less than 5 mm
    B: Floating distance of 5 to less than 10 mm
    C: Floating distance of 10 to less than 20 mm
    D: Floating distance of 20 mm or more 2.2. Ejection Stability (Immediately After Ink Filling)

After the ink prepared as described above was filled in a Printer M105 manufactured by Epson, sentences using Microsoft Word (font size: 11, style: standard, MS PGothic) at a rate of 700 characters/page were continuously printed on 20 sheets of A4-size recording media (Xerox P paper, copy paper, basis weight: 64 g/m², paper thickness: 88 μm, manufactured by Fuji Xerox Co., Ltd.) in an environment at a temperature of 25° C. and a humidity of 50%, and subsequently, a nozzle check pattern was confirmed.
[Evaluation Criteria]
    A: number of nozzle missing is 0.
    B: number of nozzle missing is 1 to 2.
    C: number of nozzle missing is 3 to 5.
    D: number of nozzle missing is 6 or more.

2.3. Ejection Stability (One Week After Ink Filling)

The ink prepared as described above was filled in a Printer M105 manufactured by Epson and then left for one week in an environment at a temperature of 25° C. and a humidity of 50%. Subsequently, sentences using Microsoft Word (font size: 11, style: standard, MS PGothic) at a rate of 700 characters/page were continuously printed on 20 sheets of A4-size recording media (Xerox P paper, copy paper, basis weight: 64 g/m², paper thickness: 88 μm, manufactured by Fuji Xerox Co., Ltd.) in an environment at a temperature of 25° C. and a humidity of 50%, and subsequently, a nozzle check pattern was confirmed.
[Evaluation Criteria]
    AA: number of nozzle missing is 1 to 2.
    A: number of nozzle missing is 3 to 5.

B: number of nozzle missing is 6 to 15.
C: number of nozzle missing is 16 to 24.
D: number of nozzle missing is 25 or more.

2.4. Color Development Property and Strike Through

The ink prepared as described above was filled in a Printer M105 manufactured by Epson, and a solid pattern was printed at a duty of 100% in a print region of 204 mm×291 mm of a A4-size recording medium (Xerox P paper, copy paper, basis weight: 64 g/m$^2$, paper thickness: 88 μm, manufactured by Fuji Xerox Co., Ltd.) in an environment at a temperature of 25° C. and a humidity of 50%. Subsequently, optical densities (OD values) of a recording surface and a rear surface of a recorded matter thus obtained were measured using a colorimeter "Xrite i1" (trade name, manufactured by Xrite). Among the measurement values thus obtained, from the measurement value of the recording surface, the color development property was evaluated, and from the measurement value of the rear surface, the strike through was evaluated.

[Evaluation Criteria (Color Development Property)]
A: OD value of 1.2 or more
B: OD value of 1.1 to less than 1.2
C: OD value of less than 1.1

[Evaluation Criteria (Strike Through)]
A: OD value of less than 0.25
B: OD value of 0.25 to less than 0.35
C: OD value of 0.35 or more

3. Evaluation Result

In Tables 1 and 2, the composition and the evaluation result of the ink of each Example are shown. From Tables 1 and 2, it was found that while the content of the water was controlled in a predetermined range, since the alcohol having 4 carbon atoms or less and the asymmetric alkyl ether were used in combination, the curling of the recorded matter to be obtained could be suppressed, and the ejection stability of the ink composition was excellent.

What is claimed is:

1. An ink jet ink composition comprising:
   a self-dispersible pigment;
   an alcohol having 4 carbon atoms or less;
   an asymmetric alkyl ether; and
   water,
   wherein a content of the alcohol with respect to a total mass of the ink jet ink composition is 8.0 to 15 percent by mass,
   a content of the water with respect to the total mass of the ink jet ink composition is 10 to 25 percent by mass, and
   a content of the asymmetric alkyl ether with respect to the total mass of the ink jet ink composition is 30 to 60 percent by mass.

2. The ink jet ink composition according to claim 1, wherein a content of the self-dispersible pigment with respect to the total mass of the ink jet ink composition is 1.0 to 10 percent by mass.

3. The ink jet ink composition according to claim 1, wherein a content of the alcohol with respect to one part by mass of the self-dispersible pigment is 0.1 to 2.5 parts by mass.

4. The ink jet ink composition according to claim 1, wherein the asymmetric alkyl ether includes a compound represented by the following formula (1)

$$R^1O—(R^3O)_n—R^2 \qquad (1)$$

where $R^1$ and $R^2$ each independently represent a hydroxy group, an alkyl group, an alkyl group having a hydroxy group, or an acyl group, $R^1$ and $R^2$ represent groups different from each other, $R^3$ represents an alkylene group having 2 to 4 carbon atoms, and n represents an integer of 1 to 4.

5. The ink jet ink composition according to claim 4, wherein in the formula (1), a total number of carbon atoms of $R^1$ and $R^2$ with respect to n is 1.5 or less.

6. The ink jet ink composition according to claim 1, wherein the asymmetric alkyl ether includes at least one selected from the group consisting of triethylene glycol monomethyl ether, triethylene glycol monobutyl ether, and diethylene glycol monoethyl ether acetate.

7. The ink jet ink composition according to claim 1, further comprising an aprotic solvent.

8. The ink jet ink composition according to claim 7, wherein the aprotic solvent includes at least one selected from the group consisting of 2-pyrrolidone, 1-(2-hydroxyethyl)-2-pyrrolidone, γ-butyrolactone, propylene carbonate, and ethylene carbonate.

9. The ink jet ink composition according to claim 7, wherein a content of the aprotic solvent with respect to the total mass of the ink jet ink composition is 10 to 40 percent by mass.

10. A recording method comprising:
    an ejection step of ejecting the ink jet ink composition according to claim 1 to a recording medium by an ink jet method.

11. The recording method according to claim 10, wherein recording medium is regular paper.

* * * * *